United States Patent [19]
Kweon et al.

[11] Patent Number: 6,111,866
[45] Date of Patent: Aug. 29, 2000

[54] METHOD OF SERVICING ASYNCHRONOUS COMMUNICATION DATA CALLING AND INCOMING CALL SIGNALLING IN CODE DIVISION MULTIPLE ACCESS MOBILE COMMUNICATION NETWORK

[75] Inventors: Hye Yeon Kweon; In Ki Baik; Sook Hyun Jang, all of Daejon-Shi, Rep. of Korea

[73] Assignee: Electronics and Telecommunications Research Institute, Daejon-shi, Rep. of Korea

[21] Appl. No.: 09/050,978

[22] Filed: Mar. 31, 1998

[30] Foreign Application Priority Data

Apr. 1, 1997 [KR] Rep. of Korea ............... 97-11987

[51] Int. Cl.[7] ............... H04J 13/00; H04Q 7/00
[52] U.S. Cl. ............... 370/335; 370/342; 370/469
[58] Field of Search ............... 370/320, 328, 370/329, 335, 342, 350, 401, 410, 469, 479; 375/130, 133, 220, 222; 455/557, 561

[56] References Cited

U.S. PATENT DOCUMENTS 5,309,501  5/1994  Kozik et al. ............... 455/410
5,329,573  7/1994  Chang et al. ............... 455/411
5,878,036  3/1999  Spartz et al. ............... 370/335

Primary Examiner—Chi H. Pham
Assistant Examiner—Kwang B. Yao
Attorney, Agent, or Firm—Jacobson, Price, Holman & Stern, PLLC

[57] ABSTRACT

The present invention relates to a method of data service in Code Division Multiple Access(CDMA) mobile communication network, and in particular to a method of servicing an asynchronous communication data which facilitates host access or computer to computer one-to-one communication. The present invention provides a method of servicing asynchronous communication data calling call and incoming call signalling in CDMA mobile communication network which embodies a protocol stack to a medium such as a notebook computer used as a data terminal by applying the user computing environment as it is, while maintaining the configuration and reducing the load of CDMA mobile terminal which currently serives a voice.

2 Claims, 4 Drawing Sheets

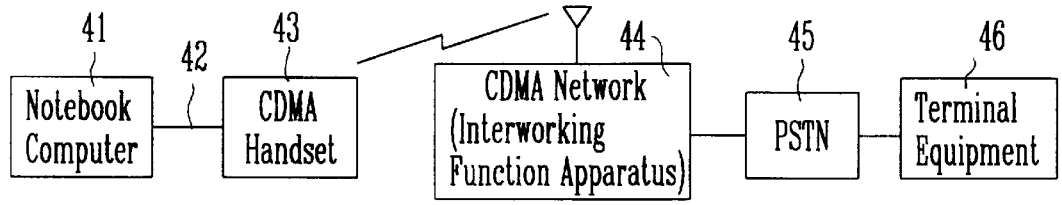
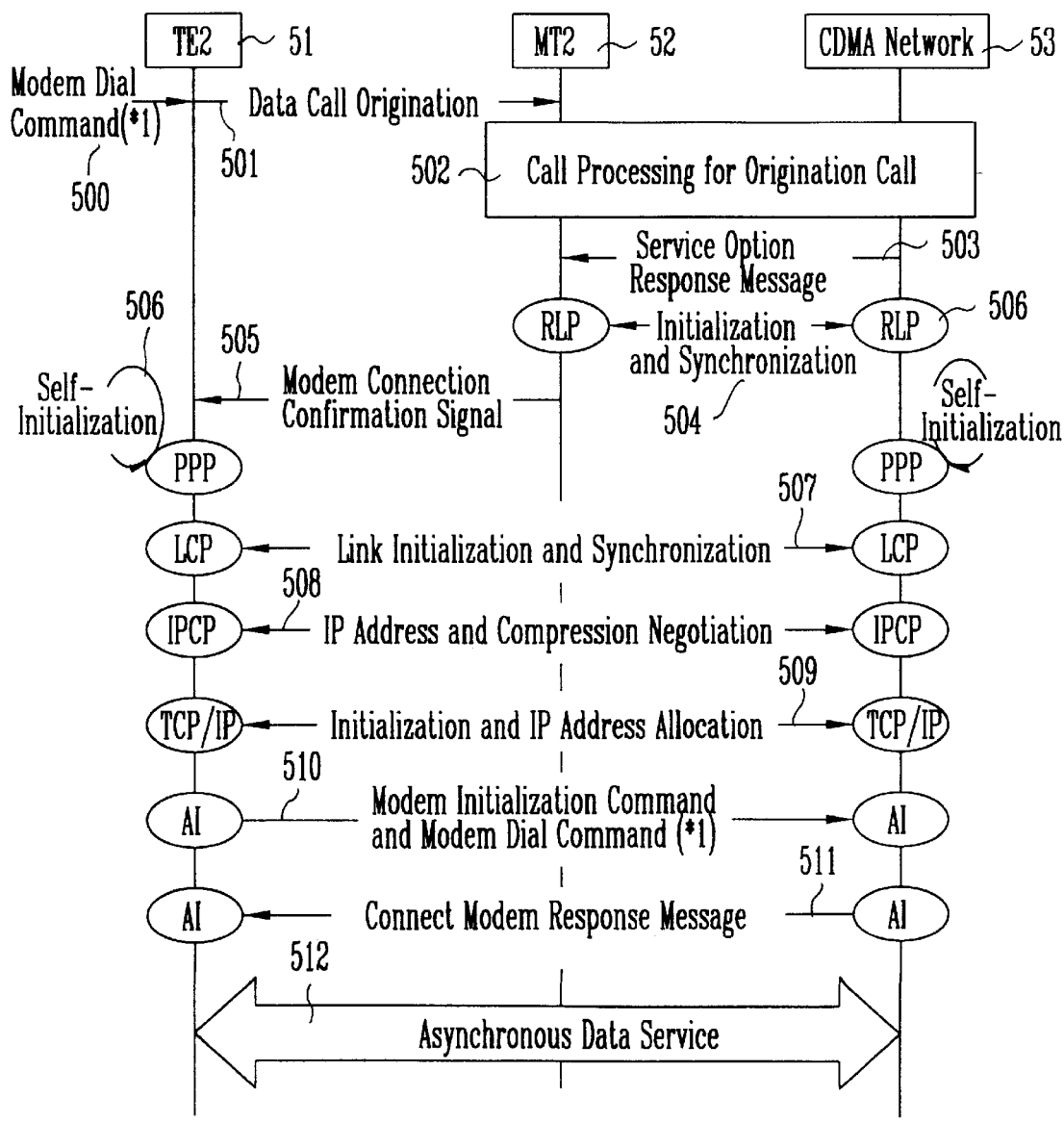

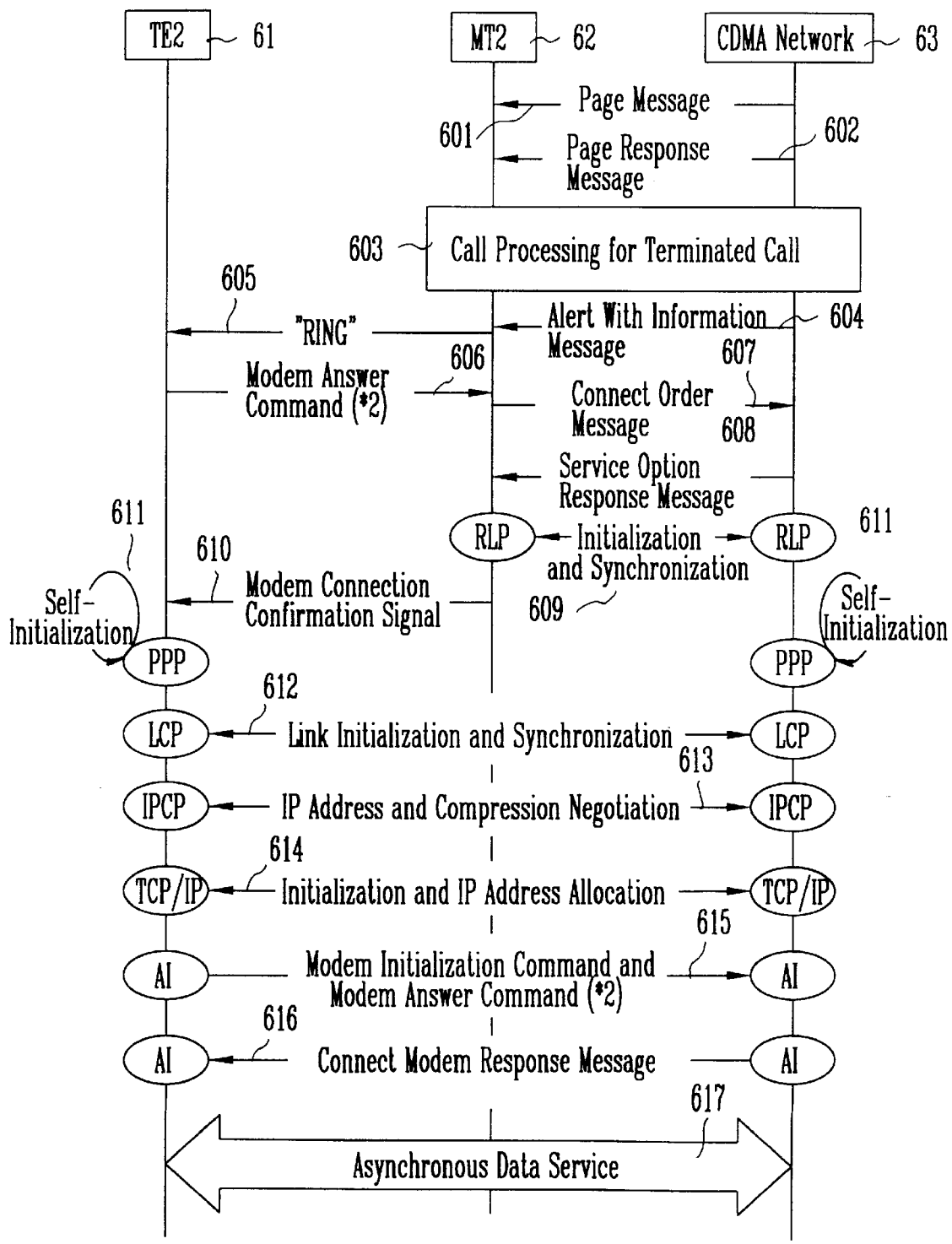

METHOD OF SERVICING ASYNCHRONOUS COMMUNICATION DATA CALLING AND INCOMING CALL SIGNALLING IN CODE DIVISION MULTIPLE ACCESS MOBILE COMMUNICATION NETWORK

BACKGROUND OF THE INVENTION

FIELD OF THE INVENTION

The present invention relates to a method of data servicing in a Code Division Multiple Access (CDMA) mobile communication network and, in particular, to a method of servicing asynchronous communication data calling and incoming call signalling in Code Division Multiple Access mobile communication network for maintaining user interface identical to that in conventional wired communication environment for reliability of data service at the time of transfer of character and file and for guaranteeing data quality, identical to that in wired communication, in wireless communication envirionment which has high error rate.

INFORMATION DISCLOSURE STATEMENT

Currently, CDMA network is used for mainly servicing voice, and terminal-to-terminal data service, that is, data service between mobile communication subscribers is not developed yet for CDMA network. The subscriber inputs a telephone number of called party user by pressing a keypad of handset of mobile terminal and then is serviced with voice traffic with counterpart subscriber through transceiver of handset. At this time, the subscriber can be given additional service other than voice service by loading asychronous communication data instead of voice on a channel through which voice is transfered.

In general, access to Hitel, Chonrian or Internet service through public switched telephone network(PSTN) can be effected by connecting a terminal connection port (telephone port) of public switched telephone network and a data modem connected to computer. At this time, the data modem converts digital data of octet unit(8 bits) into analogue signal and sends the analogue signal to the public switched telephone network, or converts analogue signal received from the PSTN into digital data and sends the digital data to the computer.

On the contrary, since all data can be transmitted in the form of digital signal up to network in a CDMA mobile communication network, the conversion of data is reguired only when transmitting the data from the mobile communication network to PSTN or other different networks. Therefore, in the CDMA mobile communication network, base station or fixed station such as mobile switching center has an interworking function(IWF) for data conversion. This IWF has a data modem pool, and additionally has a protocol conversion function between the CDMA mobile communication network and different network and a rate adaptation function between systems in the network. However, there are problems in that the reliability of the wireless communication environment is lowered due to noise, fading and handover, ete., and a separate apparatus for interworking function is required.

SUMMARY OF THE INVENTION

Therefore, an object of the present invention is to provide a method of servicing asynchronous communication data calling and incoming call signalling in CDMA mobile communication network which can guarantee the data quality identical to that in wired communication in wireless communication environment having high error rate, by embodying a protocol stack on a network reference model in the CDMA network the asynchronous communication applied to character or file transmission.

A method of servicing asynchronous communication data call signalling in Code Division Multiple Access mobile communication network to accomplish the above described object is characterized in that it comprises the steps of: a step in which a subscriber attempts a call with modem dial command in case where the configuration of mobile station which the mobile subscriber has is a data terminal and a mobile terminal and the configuration of CDMA network has interworking function apparatus; a step in which said data terminal recognizes the modem dial commend and sends the call origination signal to said mobile terminal; a step in which mobile terminal initiates a data call with the same as the call processing of that voice origination call; a step in which said mobile terminal and a base station concurrently initiate Radio Link protocol when a traffic channel is allocated from said base station to the call initiated by said mobile terminal and a service option is responded; a step in which said mobile terminal informs the data terminal of the setup of the call by sending a connection confirmation signal to the data terminal after initialization and synchronization of said Radio Link Protocol; a step in which the Point-to-Point Protocol the data terminal and the IWF of the CDMA network is self-initialized after the data terminal receives the modem connection confirmation signal; a step in which a Link Control Protocol is driven so as to initiate and synchronize a serial link after said Point-to-Point Protocols are self-initiated; a step in which Internet Protocol address and Transmission Control Protocol/Internet Protocol header compression of the data terminal and said IWF are negotiated by using Internet protocol Control Protocol after initialization and synchronization of said serial link; a step in which the Transmission Control Protocol/Internet Protocol is driven after the said Internet Protocol Control Protocol are initiated and an IP address is allocated to the Internet Protocol; a step in which an application interface of said data terminal sends according to the Transmission Control Protocol/Internet Protocol a modem initialization command and modem dial command for modem control to an Interworking Function of the CDMA network; a step in which the data terminal receives a connect modem response message informing a call connection with the counterpart from the Interworking Function of said CDMA network which received the modem initialization commands and modem dial command for modem control; and a step in which the subscriber can be serviced with asynchronous communication data after the data terminal received the connect modem response message.

In addition, a method of servicing asynchronous communication data call terminating in Code Division Multiple Access mobile communication network is characterized in that it comprises the steps of: a step in which a base station pages a mobile station with asynchronous data service with the same as the procedure of that a voice call voice terminating call in case where the configuration of mobile station which a mobile subscriber has is a data terminal and a mobile terminal; a step in which the paged mobile terminal responses the asynchronous data service by using a page response message; a step in which a traffic channel is allocated from the base station by using the same as the call processing of that voice terminating call after the mobile terminal responses to the asynchronous data service; a step in which the mobile terminal notifies the incoming call to the data terminal when an alert with information message comes from the base station after the traffic channel is allocated from the base station; a step in which the data terminal which received the arrival of the call responds to the call through a modem answer command; a step in which the mobile terminal which recognized the modem answer command notifies the answer of the call by sending a connect order message to the base station; a step in which the mobile terminal and the base station concurrently initializes and synchronizes Radio Link Protocol, if a service option is responded to the mobile terminal from the base station which received the connect order message; a step in which the mobile terminal notifies the setup of call by sending a modem connection confirmation signal to the data terminal after the Radio Link Protocol is initiated and synchronized; a step in which Point-to-Point Protocols the data terminal and the IWF of the CDMA network are respectively self-initiated; a step in which Link Control Protocols of data terminal and the IWF are respectively driven so as to initiate and synchronize a serial link after the Point-to-Point Protocols are self-initiated; a step in which Internet Protocol address and Transmission Control Protocol/Internet Protocol header compression of the data terminal and the IWF are negotiated by using Internet Protocol Control Protocol after initialization and synchronization of said serial link; a step in which the Transmission Control Protocol/Internet Protocol is driven after the Internet Protocol Control Protocol/Protocol of the data terminal and the IWF are initiated and an address is allocated to the Internet Protocol; a step in which an application interface of data terminal sends according to the Transmission Control Protocol/Internet Protocol an initialization command and modem answer command for modem control to an IWF of the CDMA network; a step in which the data terminal receives a connect modem response message informing a call connection with the counterpart from the IWF of the CDMA network which received the modem initialization command and the modem answer command for modem control; and a step in which the subscriber can be serviced with asynchronous communication data after the data terminal received the connect modem response message.

BRIEF DESCRIPTION OF THE DRAWINGS

For fuller understanding of the nature and object of the invention, reference should be had to the following detailed description taken in conjunction with the accompanying drawings in which:

FIG. 4 is a constitutional drawing of a system to which the present invention is applied;

FIG. 5 is a flow diagram showing a data service calling call procedure and a protocol operation according to the present invention; and FIG. 6 is a flow diagram showing a data service incoming call procedure and a protocol operation according to the present invention.

Similar reference characters refer to similar parts in the several views of the drawings.

DETAILED DESCRIPTION OF THE EMBODIMENTS

A detailed description of the present invention is given below with reference to the accompanying drawings.

Figure 1:
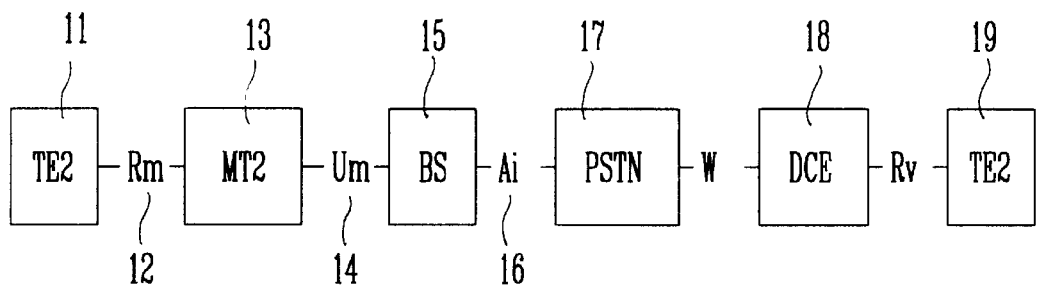
FIG. 1 is a constructional drawing of a network reference model suggested in standard proposal.

FIG. 1 is a constitutional drawing of a network reference model suggested in a standard proposal. Currently, TIA/EIA/IS-99(Data Service Option Standard for Wideband Spread Spectrum Digital Cellular System: hereinafter referred to as IS-99) standard proposal is published for development of data service in CDMA mobile communication network, and the present invention is also suggested based on IS-99 for standardization. Data terminal 2(hereinafter referred to as TE2) 11 represents a data terminal having user interface, and a mobile termination 2(hereinafter referred to as MT2) 13 is a CDMA mobile termination providing a data transfer path and constitutes together with TE2 11 a Rm interface 12 physically having an EIA/TIA/RS-232-E interface. A base station(hereinafter referred to as BS) 15 is a CDMA base station having together with MT2 13 a Um interface 14, and has an Interworking Function(hereinafter referred to as IWF) for interworking with a Public Switched Telephone Network (hereinafter referred to as PSTN) 17. BS 15 and PSTN 17 have Ai interface 16 between them, and Data Circuit Terminating Equipment(DCE) 18 and a second Data terminal (TE2) 19 have between them a user interface being currently used in conventional PSTN17.

The present invention only suggests an interface for asynchronous communication data transfer between TE2 11, MT2 13 and BS 15, keeping the configuration of PSTN 17 and thereafter, as it is, as the configuration of existing wired or analogue mobile communication networks.

Figure 2:
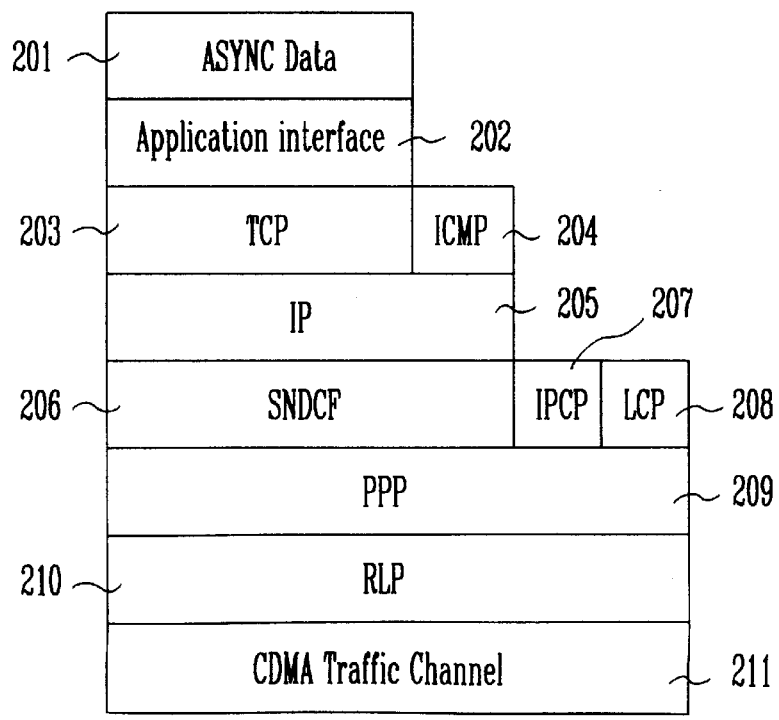
FIG. 2 is a structural drawing of a protocol stack suggested in the standard proposal.

FIG. 2 is a structural drawing of protocol stack suggested in a standard proposal. Um interface 14 between MT2 13 and BS 15 in this protocol Stack is in accordance with IS-99 standard proposal, and this protocol stack is proposed for reliable data transfer between user data terminal and IWF in wireless environment which does not have reliability due to noise, fading and handover, etc.

Asynchronous data 201 of the upper level represents an application software for data service. Application Interface 202 has a function of the processing a standard and extended AT command process section and a function of data compression negotiation, etc. This protocol stack uses as its protocol of transport layer and network layer an Internet Control Message Protocol(ICMP) 204 and Transmission Control Protocol/Internet Protocol(TCP/IP) 203/205 being frequently used in existing Internet and embodies an Internet Protocol Control Protocol(IPCP) 207, a Link Control Protocol(LCP) 208, and a Point-Point Protocol(PPP) 209 for transferring packets in serial link and a sub-Network Dependent Convergence Function(SNDCF) Protocol 206 for TCP/IP 203/205 header compression. There are larger noise and fading on Ai interface between a mobile station and a base station in CDMA network in comparison with existing wired channel, and the data service requires lower Bit Error Rate(BER) than that in voice service on wireless channel. A Radio Link Protocol(RLP) 210 is a Link layer protocol for compensation of a limitaion of data service on wireless traffic channel and takes charge of synchronization, data re-transfer and flow control between the two stations. RLP layer 210 divides variable length data packet of the upper layer into CDMA traffic channel 211 frames in accordance with multiplxing sub-layer according to CDMA traffic channel 211. In addition, since RLP 210 does not interfere with method of constituting frame of upper layer, it considers the frame of upper lay as a series of octets not related to particular service and transfers the frames in the order it receives them from the upper layer.

Figure 3:
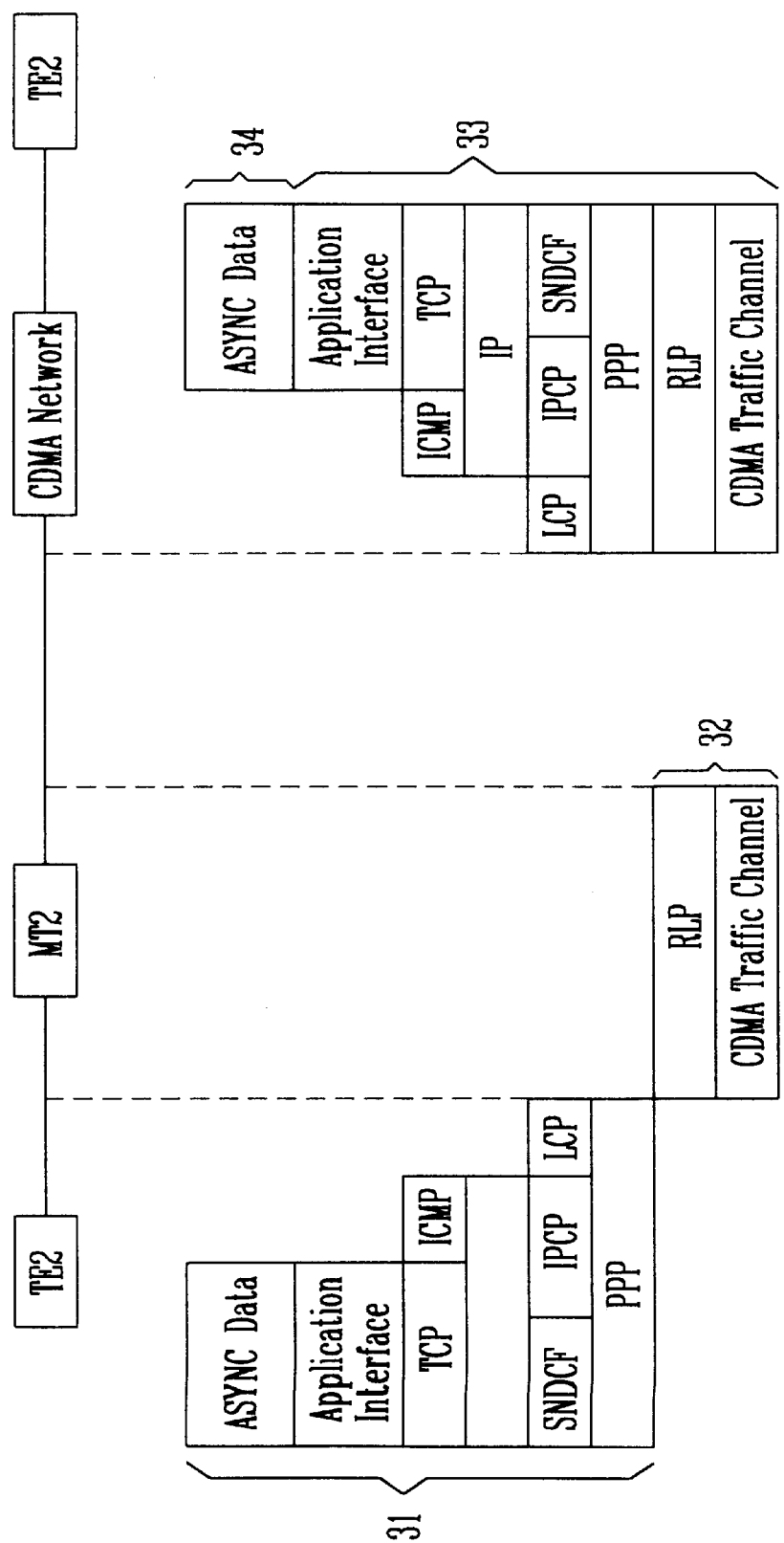
FIG. 3 is a structural drawing of a protocol stack to which the present invention is applied.

FIG. 3 is a constructional drawing of protocol stack to which the present invention is applied. This protocol stack embodies the protocol stack shown in FIG. 2 on the network reference model shown in FIG. 1. Application program for asynchronous data and protocols of PPP 209 and above are loaded 31 on a data terminal such as a notebook computer, etc., protocols of RLP 210 and below are loaded 32 on a CDMA mobile termination, thereafter the data terminal and mobile termination are physically connected to each other with RS-232-E compatible cable, and counterpart protocol stack can be configured to distribut or integrate various side of the CDMA network. This configuration has an advantage in that if a communication emulator program which can interwork with the protocol stack is embodied in the current computer networking environment on a basic level in which PPP 209 and TCP/IP protocol 203/205 are basically supporting, then a subscriber can be easily provided with asynchronous communication data service with user interface identical to existing wired environment by utilizing only one simple cable in his own computer environment.

FIG. 4 is a constitutional drawing of a system to which the present invention is applied. This is an example of constitution of a CDMA asynchronous data communication service system constituted according to the position of the protocol stack shown in FIG. 3. It shows a condition in which a subscriber having a notebook computer 41, CDMA handset 43 and RS-232-E compatible cable 42 connecting the notebook computer 41 and handset 43 accesses a data terminal 46 through a CDMA network with IWF and public Switched Telephone Network.

Here, this CDMA network includes the base station and mobile switching center(MSC). And the IWF apparatus may be made on the base station or MSC of the CDMA network.

FIG. 5 is a flow diagram showing a data service calling call procedure and protocol operation according to the present invention. This shows an asynchronous communication transfer procedure when a mobile subscriber attempts a call in the configuration shown in FIG. 4. Attemptation of a call begins with a modem dial command (500). An application interface of data terminal 52 which recognized the modem dial command sends a data call origination signal to mobile termination (501). The mobile termination initiates a data call following the same call processing as that of a voice. When a traffic channel is allocated from a CDMA network 53 to the call initialized by the mobile termination 52 and a service option is responded (503), the mobile termination 52 which received the service option response message and the CDMA network 53 concurrently initiate the RLP (504). Thereafter, the mobile termination 52 informs the data terminal 51 of the setup of the call by sending a modem connection confirmation signal to the data terminal 51 (505). After the data terminal 51 receives the modem connection confirmation signal, the PPP of the data terminal 51 and the CDMA network 53 are self-initialized (506). Thereafter, the LCP is driven so that the serial link is initialized and synchronized (507), and Internet Protocol(IP) address and TCP/IP header compression of the data terminal 51 and the CDMA network 53 are negotiated by using the IPCP (508). Thereafter, TCP/IP of the data terminal 51 and CDMA network 53 are initialized and an IP address is allocated to IP (509), then the application interface of data terminal 51 sends (510) according to these protocols modem initialization commands and the modem dial command for modem control to IWF of CDMA network 53. If connect modem response message informing a call connection with the counterpart is received from IWF which received the modem initialization commands and the modem dial command for modem initialization (511), the subscriber can be serviced with asynchronons communication data (512).

FIG. 6 is a flow diagram showing data service incoming call procedure and protocol operation according to the present invention. This represents an asynchronous communication transfer procedure when the mobile subscriber receives a call in the configuration shown in FIG. 4. The base station of the CDMA network 63 pages the mobile station with asynchronous data call by using a call processing identical to voice terminating call processing (601), and the paged mobile terminal 62 responses the asynchronous data call by using a page responsement message (602). The CDMA network 63 covers both a case of identifying an incoming call from Pubtic Switched Telephone Network and the use of service option reserved in advance between mobile terminal 62 and CDMA network 63. A traffic channel is allocated (603) from the CDMA network 63 according to the same call processing as that of a voice after the mobile terminal responses the asynchronous data service, and when an alert with information message comes in (604) from the CDMA network 62, the mobile terminal 62 notifies (605) the incoming call to the data terminal 61 and the data terminal 61 responses (606) the call with modem answer command. The mobile terminal 62 which recognized the modem answer command notifies (607) the responsement of the call by sending a order command message to the CDMA network 63. If a service option is responded (608) from the CDMA network 63 which received the connect order message, the mobile terminal 62 and the CDMA network 63 concurrently initializes and synchronizes RLP (609). If the RLP is initialized, the mobile terminal 62 notifies (610) the setup of call by sending a modem connection confirmation signal to the data terminal 61. Thereafter, the PPP of the data terminal 61 and the CDMA network 63 are respectively self-initialized (611) and LCP of the data terminal 61 and the CDMA network 63 are respectively driven so that the serial link is initialized and synchronized (612). Thereafter, IP address and TCP/IP header compression of the data terminal 61 and the CDMA network 63 are negotiated by using the IPCP (613). Thereafter, TCP/IP is initiated and an address is allocated to IP (614), then the application interface of data terminal sends (615) according to these protocols modem initialization command and modem answer command for modem control to IWF of CDMA network (63). If the data terminal receives a connect modem response message (616) notifying the call connection with the counterpart from the IWF of the CDMA network which received the modem initialization command and the modem answer command for modem control, the subscriber can be serviced with asynchronous communication data (617).

According to the present invention as described above, there are excellent effects that it is guaranteed that the subscriber of CDMA mobile communication network can be serviced with data quality identical to that in wired communication in wireless environment maintaining user interface identical to that in conventional wired environment, and that if a communication emulator program which can interwork with the protocol stack is embodied in the current computer environment, then a subscriber can be provided with data communication other than voice at any time and any place only with a data terminal and a cable without requiring separate equipments in his own computer environment.

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations that may be made within the scope and the spirit of the present invention are to be encompassed as further embodements of the present invention.

What is claimed is:

1. A method of servicing asynchronous communication data calling call signalling in Code Division Multiple Access mobile communication network comprising the steps of:

a step in which a subscriber attempts a call with modem dial command in case where the configuration of mobile station which the mobile subscriber has is a data terminal and a mobile terminal;

a step in which said data terminal which recognized the modem dial command sends a call origination signal to the mobile terminal;

a step in which said mobile terminal initiates a data call following the same call processing as that of a voice;

a step in which said mobile terminal and a CDMA network concurrently initialize Radio Link Protocol when a traffic channel is allocated from a base station of the CDMA network to the said mobile terminal and a service option is responded;

a step in which said mobile terminal informs the data terminal of the setup of the call by sending a connection confirmation signal to the data terminal after initialization and synchronization of said Radio Link Protocol;

a step in which the Point-to-Point Protocols of the data terminal and a IWF of the CDMA network are self-initialized after the data terminal receives the modem connection confirmation signal;

a step in which a Link Control Protocol is driven so as to initiate and synchronize a serial link after said Point-to-Point Protocols are self-initiated;

a step in which Internet Protocol address and Transmission Control Protocol/Internet Protocol header compression of the data terminal and the IWF is negotiated by using Internet Protocol Control Protocol after initialization and synchronization of said serial link;

a step in which the Transmission Control Protocol/Internet Protocol are driven after the Transmission Control Protocol/Internet Protocol are initiated and an address is allocated to the Internet Protocol;

a step in which an application interface of the data terminal sends according to the Transmission Control Protocol/Internet Protocol modem initialization commands and the modem dial command for modem control to the IWF of the CDMA network;

a step in which the data terminal receives a connect modem response message informing a call connection with the counterpart from the IWF of the CDMA network which received the modem initialization commands and the modem dial command for modem control; and a step in which the subscriber can be serviced with asynchronous communication data after the data terminal received the connect modem response message.

2. A method of servicing asynchronous communication data incoming call signalling in Code Division Multiple Access mobile communication network comprising the steps of:

a step in which a base station pages a mobile station with asynchronous data call identical to that of voice terminating in case where the configuration of the mobile station which a mobile subscriber has is a data terminal and a mobile terminal;

a step in which the paged mobile terminal responses the asynchronous data call by using a page response message;

a step in which a traffic channel is allocated from the base station of the CDMA network following the same call processing as that of a voice after the mobile terminal responses the asynchronous data call;

a step in which the mobile terminal notifies the incoming call to the data terminal when an alert with information message comes in from the CDMA network after the traffic channel is allocated from the CDMA network;

a step in which the data terminal which received the arrival of the call responses the call through a modem answer command;

a step in which the mobile terminal which recognized the modem answer command notifies the response of the call by sending a connect order message to the CDMA network;

a step in which the mobile terminal and base station of the CDMA network concurrently initializes and synchronizes Radio Link Protocol, if a service option is responded to the mobile terminal from the CDMA network which received the connect order message;

a step in which the mobile terminal notifies the setup of call by sending a modem connection confirmation signal to the data terminal after the Radio Link Protocol is initiated and synchronized;

a step in which Point-to-Point Protocols of the data terminal which received the modem connect signal and the IWF of the CDMA network are respectively self-initiated;

a step in which Link Control Protocols of data terminal and the IWF are respectively driven so as to initiate and synchronize a serial link after the Point-to-Point Protocols are self-initiated;

a step in which Internet Protocol address and Transmission Control Protocol/Internet Protocol header compression of the data terminal and the IWF are negotiated by using Internet Protocol Control Protocol after initialization and synchronization of said serial link;

a step in which the Transmission Control Protocol/Internet Protocol are driven after the Transmission Control Protocol/Internet Protocol of the data terminal and the IWF are initiated and an address is allocated to the Internet Protocol;

a step in which an application interface of the data terminal sends according to the Transmission Control Protocol/Internet Protocol modem initialization command and the modem answer command for modem control to the IWF of the CDMA network;

a step in which the data terminal receives a connect modem response message informing a call connection with the counterpart from the IWF of the CDMA network which received the modem initialization commands and the modem answer command for modem control; and a step in which the subscriber can be serviced with asynchronous communication data after the data terminal received the connect modem response message.

* * * * *